United States Patent
Ono et al.

(10) Patent No.: US 6,667,827 B2
(45) Date of Patent: Dec. 23, 2003

(54) BEAM SHUTTER

(75) Inventors: Hiroaki Ono, Aichi (JP); Shohei Abe, Shizuoka (JP); Hideo Takeshita, Aichi (JP); Shusuke Wada, Shizuoka (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 10/205,148

(22) Filed: Jul. 23, 2002

(65) Prior Publication Data
US 2003/0021003 A1 Jan. 30, 2003

(30) Foreign Application Priority Data
Jul. 25, 2001 (JP) ........................ 2001-223955

(51) Int. Cl.[7] ................................................. G02F 1/09
(52) U.S. Cl. ........................ 359/281; 359/280
(58) Field of Search ................. 359/280, 281, 359/283, 301, 483, 494, 495; 398/65, 45

(56) References Cited
U.S. PATENT DOCUMENTS 6,166,838 A * 12/2000 Liu et al. ....................... 398/1
6,288,807 B1 * 9/2001 Wu et al. ....................... 398/9

* cited by examiner

Primary Examiner—Scott J. Sugarman
Assistant Examiner—Richard Hanig
(74) Attorney, Agent, or Firm—Heller Ehrman White & McAuliffe

(57) ABSTRACT

A beam shutter is provided which comprises a plane-parallel birefringent element for separation arranged to separate input light beams having orthogonal polarization directions on the same optical path; a plane-parallel birefringent element for synthesis arranged to synthesize light beams having orthogonal polarization directions on different optical paths, for output; the birefringent element for separation and the birefringent element for synthesis being disposed in a spaced apart relationship; and polarization rotating means having a variable Faraday rotator, the polarization rotating means interposed between the birefringent element for separation and the birefringent element for synthesis, for magneto-optically controlling the polarization directions; wherein transmission and interruption of output light beams are controlled by switching the polarization directions by means of the variable Faraday rotator.

14 Claims, 9 Drawing Sheets

(ON STATE)

(OFF STATE)

(ON STATE)

(OFF STATE)

BEAM SHUTTER

CROSS REFERENCE TO RELATED APPLICATIONS

The present application claims priority upon Japanese Patent Application No. 2001-223955 filed on Jul. 25, 2001, which is herein incorporated by reference.

BACKGROUND OF THE INVENTION

1. Field of the Invention

The present invention relates generally to a beam shutter for providing a control of transmission and interruption of output light beams, and more particularly to a magneto-optical beam shutter having a plurality of plane-parallel birefringent elements and a variable Faraday rotator, configured to provide an on/off control of light beams by changing the direction of polarization by means of the variable Faraday rotator.

2. Description of the Related Arts

In the field of optical communications, optical measurement systems, etc., a beam shutter is incorporated as a protection feature for a light receiving element. When a main switch is turned on for example, high energy light beams may occur instantaneously (e.g., during several milliseconds to several seconds) in association with the systems, which may possibly break down the light receiving element. Thus, the beam shutter is disposed at the input side of the light receiving element so that control is provided to activate an optical path after light beams reach a certain stable level. Otherwise, any causes may possibly result in an instantaneous occurrence of the high energy light beams.

The conventional beam shutter is a mechanical one. For instance, arrangement is such that a mirror is disposed on the optical path and driven by a motor. The orientation and location of the mirror are changed so as to control the transmission and interruption of the output light beams.

However, the mechanical beam shutter drives the mirror and other optical components by means of a drive mechanism such as the motor, which makes the apparatus larger and susceptible to degradation in characteristics due to wear or damage of the movable parts, impairing the reliability. A longer time is required for the drive thereof and instant actions cannot be dealt with.

SUMMARY OF THE INVENTION

It is therefore one object of the present invention to provide a magneto-optical beam shutter capable of a rapid switching between the transmission and interruption due to having no movable parts, and capable of securely protecting the light receiving element and the like.

In order to attain the above and other objects, according to a first aspect of the present invention there is provided a beam shutter comprising a plane-parallel birefringent element for separation arranged to separate input light beams having orthogonal polarization directions on the same optical path; a plane-parallel birefringent element for synthesis arranged to synthesize light beams having orthogonal polarization directions on different optical paths, for output; the birefringent element for separation and the birefringent element for synthesis being disposed in a spaced apart relationship; and polarization rotating means having a variable Faraday rotator, the polarization rotating means interposed between the birefringent element for separation and the birefringent element for synthesis, for controlling the polarization directions; wherein transmission and interruption of output light beams are controlled by switching the polarization directions by means of the variable Faraday rotator.

In this case, the polarization rotating means may include a combination of a ±45 degree variable Faraday rotator and a ½ wave plate having an optical axis defined to rotate the polarization directions through 45 degrees. Alternatively, the polarization rotating means may include, in the mentioned order, a ½ wave plate arranged to rotate the polarization directions through 45 degrees, a pair of polarizers having optical axes symmetrically defined on both optical paths so as to allow light beams transmitted through the ½ wave plate to intactly pass therethrough, and a ±45 degree variable Faraday rotator.

According to a second aspect of the present invention there is provided a beam shutter comprising a plane-parallel birefringent element for separation arranged to separate input light beams having orthogonal polarization directions on the same optical path; a plane-parallel birefringent element for optical path control arranged to control optical paths depending on the polarization directions; a plane-parallel birefringent element for synthesis arranged to synthesize light beams having orthogonal polarization directions on different optical paths, for output; the birefringent element for separation, the birefringent element for optical path control and the birefringent element for synthesis being disposed in a spaced apart relationship; and polarization rotating means interposed between the birefringent element for separation and the birefringent element for optical path control and between the birefringent element for optical path control and the birefringent element for synthesis, the polarization rotating means rotating the polarization directions through 45 degrees, at least one of the polarization rotating means having a ±45 degree variable Faraday rotator; wherein transmission and interruption of output light beams are controlled by switching the polarization directions by means of the variable Faraday rotator.

According to a third aspect of the present invention there is provided a beam shutter comprising a plane-parallel birefringent element for separation arranged to separate input light beams having orthogonal polarization directions on the same optical path; a plane-parallel birefringent element for optical path control arranged to control optical paths depending on the polarization directions; a plane-parallel birefringent element for synthesis arranged to synthesize light beams having orthogonal polarization directions on different optical paths, for output; the birefringent element for separation, the birefringent element for optical path control and the birefringent element for synthesis being disposed in a spaced apart relationship; first polarization rotating means interposed between the birefringent element for separation and the birefringent element for optical path control, for converting the polarization directions from orthogonal to parallel; and second polarization rotating means interposed between the birefringent element for optical path control and the birefringent element for synthesis, for converting the polarization directions from orthogonal to parallel; at least one of the first and second polarization rotating means having a ±45 degree variable Faraday rotator; wherein transmission and interruption of output light beams are controlled by switching the polarization directions by means of the variable Faraday rotator.

According to a fourth aspect of the present invention there is provided a beam shutter comprising a first plane-parallel birefringent element for separation arranged to separate input light beams having orthogonal polarization directions on the same optical path; a first plane-parallel birefringent element for synthesis arranged to synthesize light beams having orthogonal polarization directions on different optical paths, for output; the first birefringent element for separation and the first birefringent element for synthesis being disposed in a spaced apart relationship; a second plane-parallel birefringent element for separation arranged to separate input light beams having orthogonal polarization directions on the same optical path; a second plane-parallel birefringent element for synthesis arranged to synthesize light beams having orthogonal polarization directions on different optical paths, for output; the second birefringent element for separation and the second birefringent element for synthesis being disposed in a spaced apart relationship and located posterior to the first birefringent element for separation and the first birefringent element for synthesis; first polarization rotating means having a variable Faraday rotator, the first polarization rotating means interposed between the first birefringent element for separation and the first birefringent element for synthesis, for controlling the polarization directions; second polarization rotating means having a variable Faraday rotator, the second polarization rotating means interposed between the second birefringent element for separation and the second birefringent element for synthesis, for controlling the polarization directions; wherein transmission and interruption of output light beams are controlled by switching the polarization directions by means of the first and second variable Faraday rotators.

In the above aspects of the present invention, the variable Faraday rotator may comprise a Faraday element and variable magnetic field applying means, the variable magnetic field applying means being comprised of magnetic circuits each having a coil and a gap, the direction of Faraday rotation being changed through the control of the direction of magnetic field applied. In the event of incorporating a plurality of variable Faraday rotators, a corresponding number of magnetic circuits each having a coil may be provided for individual Faraday elements, but instead, a single (common) magnetic circuit having a coil and a plurality of gaps may also be used. The magnetic circuit may be made of a semi-hard magnetic material so that the direction of Faraday rotation can be kept even though current flowing through the coil is cut off, thereby making the power saving possible.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Figure 1:
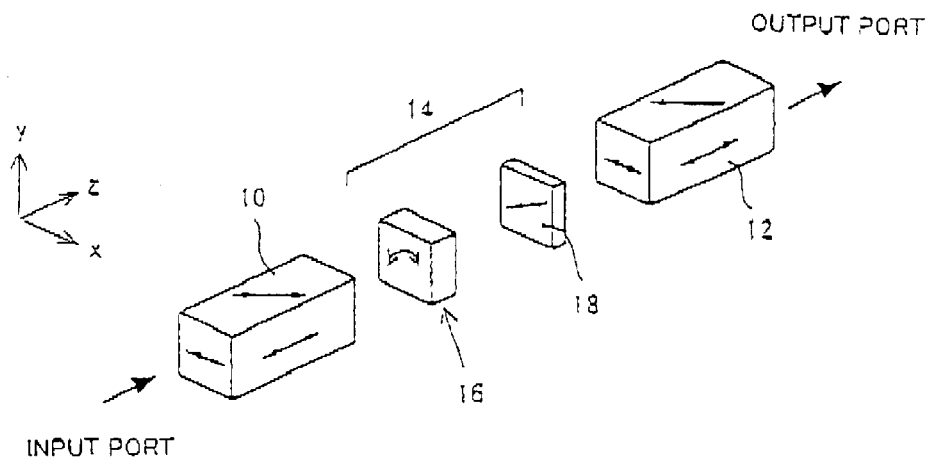
FIG. 1 illustrates a component array of an embodiment of a beam shutter in accordance with the present invention.

FIG. 1 is a component array diagram showing an embodiment of a beam shutter in accordance with the present invention. Arrows in each optical component indicate the direction of the optical axis or the direction of the Faraday rotation. To facilitate understanding of the description, coordinate axes are defined as follows. Let z direction (depth direction in the diagram) represent the direction of array of optical components, and x direction (horizontal direction in the diagram) and y direction (vertical direction in the diagram) represent two directions orthogonal to z direction. The plus direction of rotation represents the clockwise direction when viewed z direction.

In z direction there are arranged, in a spaced apart relationship, a plane-parallel birefringent element 10 for separation serving to separate input light beams having orthogonal polarization directions on the same optical path into x direction, and a plane-parallel birefringent element 12 for synthesis serving to synthesize light beams having orthogonal polarization directions on different optical paths in x direction, for output. As used herein, the "plane-parallel" refers to a geometric configuration having an entry surface and an exit surface which are parallel to each other (the entry surface need not be strictly normal to the incident light). The plane-parallel shape can include not only a parallel plate shape but also a parallelogrammic block shape, a rectangular parallelepiped shape, etc. The birefringent element for separation and the birefringent element for synthesis can be the same one. Between the two birefringent elements are interposed polarization rotating means 14 for selectively providing a control to rotate the polarization direction through 90 degrees or keep it unchanged. In this embodiment, the polarization rotating means 14 include a combination of a ±45 degree variable Faraday rotator 16 and a ½ wave plate 18 having an optical axis tilted −22.5 degrees relative to x-axis so as to rotate the polarization direction through 45 degrees. The ±45 degree variable Faraday rotator 16 and ½ wave plate 18 may reversely be arranged.

Figure 2:
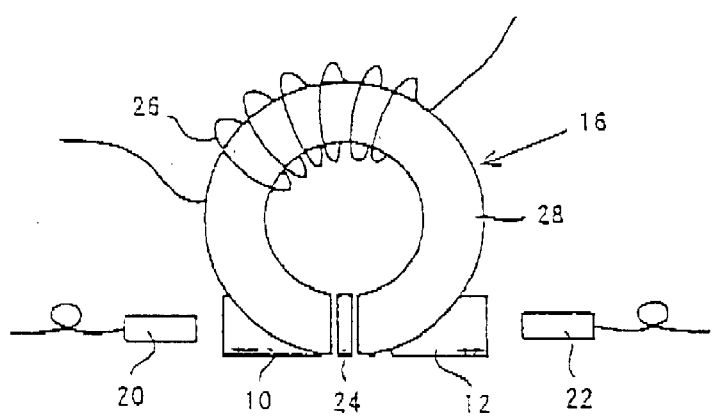
FIG. 2 is an explanatory diagram of an exemplary structure thereof.

FIG. 2 shows an exemplary structure of this beam shutter. An input port 20 is positioned opposite to the birefringent element 10 for separation, and an output port 22 confronts the birefringent element 12 for synthesis. The ±45 degree variable Faraday rotator 16 comprises a 45 degree Faraday element (e.g., a magneto-optical crystal with garnet structure) 24 disposed on the optical path, and a magnetic circuit 28 having a coil 26 and a gap for receiving the Faraday element 24. The material of the magnetic circuit is preferably a semi-hard magnetic material presenting square-loop hysteresis characteristics.

Figures 3A, 3B:
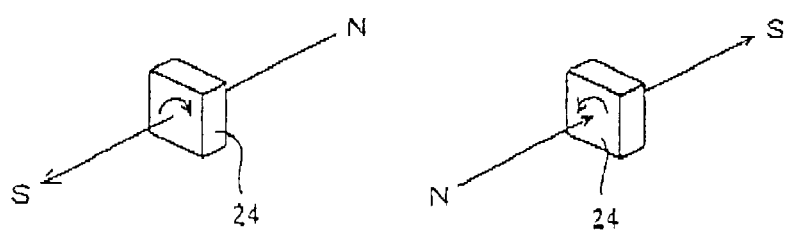
FIGS. 3A and 3B are explanatory diagrams of operations of a variable Faraday rotator.

FIGS. 3A and 3B show operations of the variable Faraday rotator. When current is supplied through the coil in one direction (e.g., positive direction), the magnetic circuit is magnetized so that an external magnetic field is applied in one direction as shown in FIG. 3A, to thereby cause a Faraday rotation of +45 degrees. This state will continue due to residual magnetization of the magnetic circuit even though the current supply is cut off. When current is supplied through the coil in the reverse direction (e.g., negative direction), the magnetic circuit is magnetized in the reverse direction so that an external magnetic field is applied in the reverse direction as shown in FIG. 3B, to consequently cause a Faraday rotation of −45 degrees. This state will also continue due to residual magnetization of the magnetic circuit even though the current supply is cut off. Thus, by changing the direction of the current flowing through the coil to change the direction of the magnetic field applied, the Faraday rotation angle can be switched between ±45 degrees.

Figure 4A:
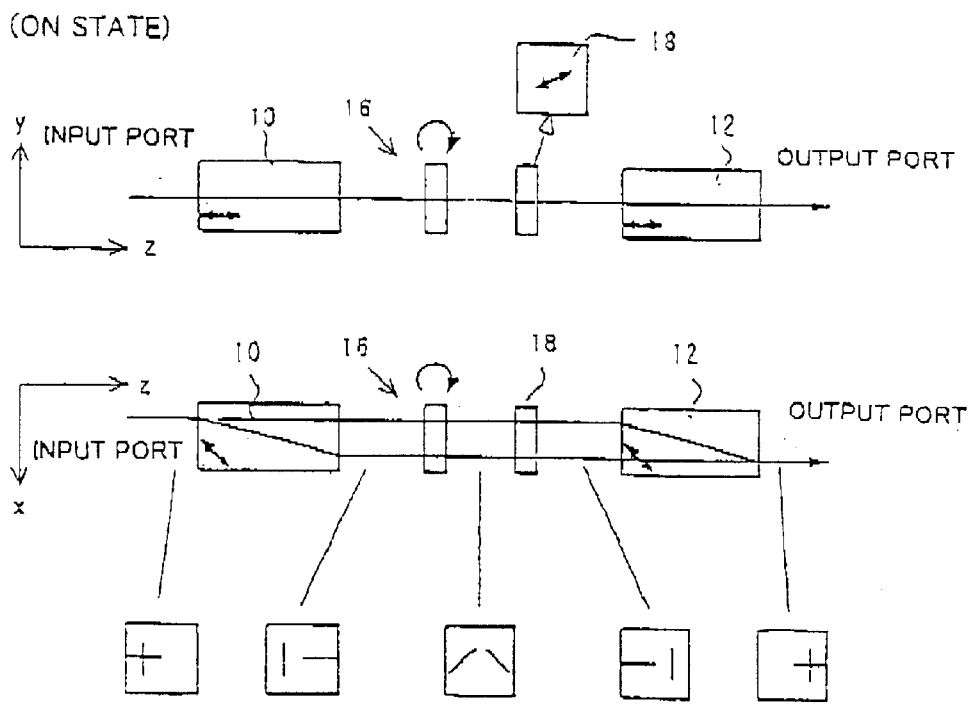
FIGS. 4A and 4B are explanatory diagrams of optical paths thereof.
Figure 4B:
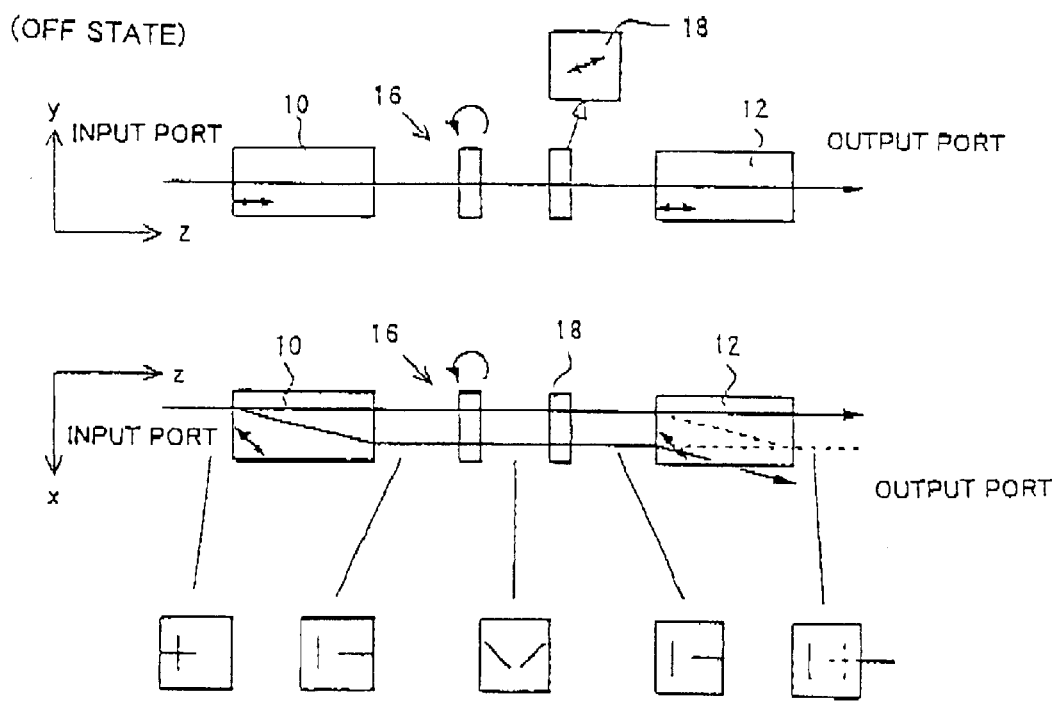

FIGS. 4A and 4B show the optical path and the polarization direction of this beam shutter. Of these diagrams, FIG. 4A depicts an on-state (light transmitted state) and FIG. 4B depicts an off-state (light interrupted state), with the upper half of each representing y-z plane (side elevation) and the lower half of each representing x-z plane (top plan).

(On-State/Light Transmitted State: See FIG. 4A)

The coil current is controlled so that the direction of Faraday rotation of the variable Faraday rotator 16 is set to +45 degree (see FIG. 3A). Of light beams entering through the input port in z direction, an ordinary light beam is permitted to travel straight by the birefringent element 10 for separation, but an extraordinary light beam is refracted to x direction for light separation by the birefringent element 10 for separation. The two light beams are subjected by the variable Faraday rotator 16 to +45 degree rotation of the polarization direction and then enter the ½ wave plate 18. Due to the property of the ½ wave plate 18 to convert the polarization direction of the input light beams symmetrically with respect to the optical axis, the input light beams are further rotated +45 degrees. A light beam on the left-hand optical path serves as an extraordinary light beam for the birefringent element 12 for synthesis and hence is refracted thereat, whereas a light beam on the right-hand optical path serves as an ordinary light beam for the birefringent element 12 for synthesis and hence is permitted to travel straight intactly. The two light beams are synthesized for the output from the output port.

(Off-State/Light Interrupted State: See FIG. 4B)

The coil current is controlled so that the direction of Faraday rotation of the variable Faraday rotator 16 is set to −45 degree (see FIG. 3B). Of light beams entering through the input port in z direction, an ordinary light beam is permitted to travel straight by the birefringent element 10 for separation, but an extraordinary light beam is refracted to x direction for light separation by the birefringent element 10 for separation. The two light beams are subjected by the variable Faraday rotator 16 to −45 degree rotation of the polarization direction and then enter the ½ wave plate 18. At the ½ wave plate 18, the input light beams are rotated +45 degrees. A light beam on the left-hand optical path serves as an ordinary light beam for the birefringent element 12 for synthesis and hence is permitted to travel straight intactly, whereas a light beam on the right-hand optical path serves as an extraordinary light beam for the birefringent element 12 for synthesis and hence is refracted to the direction away from the ordinary light beam. For this reason, the two light beams are not synthesized and coupled together at the output port.

Thus, by switching the direction of Faraday rotation between +45 degrees and −45 degrees through the control of current supplied to the variable Faraday rotator 16, the light transmission and interruption can rapidly be changed over. As a result of using the semi-hard magnetic material with square-loop hysteresis characteristics as the material of the magnetic circuit of the variable Faraday rotator 16, it is sufficient to effect the current supply only upon the changeover between the light transmission and light interruption, without needing any current supply for the other duration where the changeover is not required, whereupon power saving can be achieved.

Figure 5A:
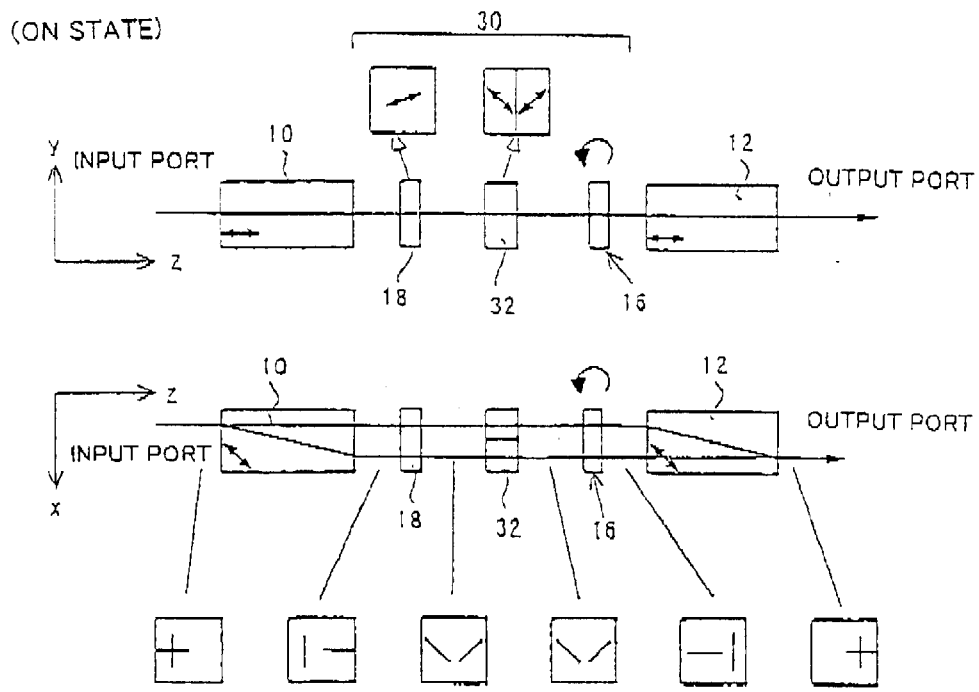
FIGS. 5A and 5B are optical path explanatory diagrams showing another embodiment of the beam shutter in accordance with the present invention.
Figure 5B:
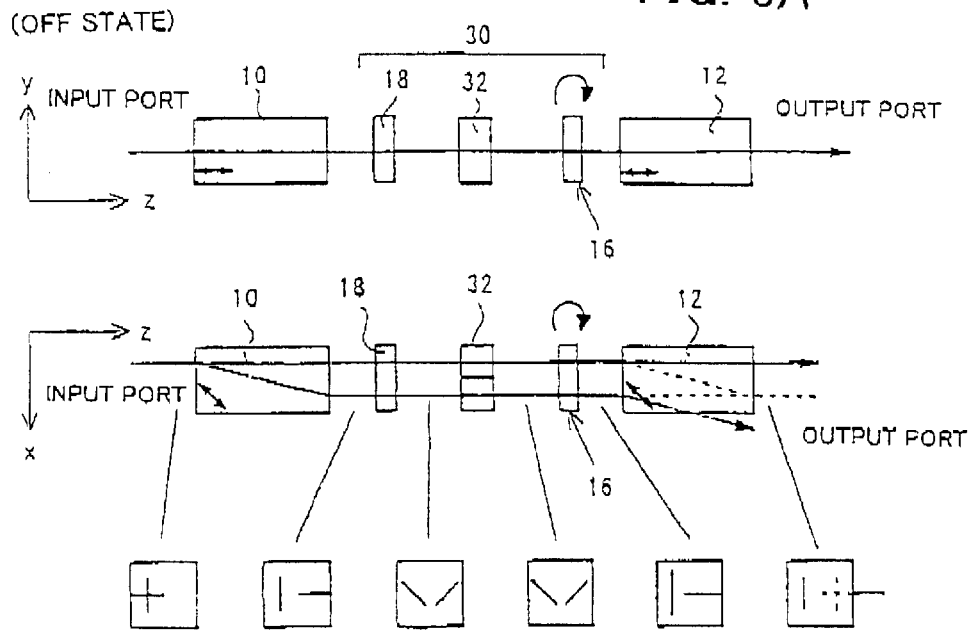

FIGS. 5A and 5B are optical path explanatory views showing another embodiment of the present invention. FIG. 5A depicts an on-state (light transmitted state) and FIG. 5B depicts an off-state (light interrupted state). In this embodiment, similar to the above embodiment, there are arranged, in a spaced apart relationship in z direction, a plane-parallel birefringent element 10 for separation serving to separate input light beams having orthogonal polarization directions on the same optical path into x direction, and a plane-parallel birefringent element 12 for synthesis serving to synthesize light beams having orthogonal polarization directions on different optical paths in x direction, for output. Between the two birefringent elements are interposed polarization rotating means 30 for selectively providing a control to rotate the polarization direction through 90 degrees or keep it unchanged. In this embodiment, the polarization rotating means 30 include a combination of a ½ wave plate 18, a pair of polarizers 32, and a ±45degree variable Faraday rotator 16. The ½ wave plate 18 has an optical axis tilted −22.5 degrees relative to x-axis so as to rotate the polarization direction through 45 degrees. The pair of polarizers 32 are laterally juxtaposed and have their respective optical axes tilted +45 degrees on the left-side optical path and −45 degrees on the right-hand optical path, respectively, relative to x axis.

(On-State/Light Transmitted State: See FIG. 5A)

The coil current is controlled so that the direction of Faraday rotation of the variable Faraday rotator 16 is set to −45 degree (see FIG. 3B). Of light beams entering through the input port in z direction, an ordinary light beam is permitted to travel straight by the birefringent element 10 for separation, but an extraordinary light beam is refracted to x direction for light separation by the birefringent element 10 for separation. The two light beams enter the ½ wave plate 18 where their respective polarization directions are rotated +45 degrees. The two light beams pass intactly through the pair of polarizers 32 and enter the variable Faraday rotator 16 where their respective polarization directions are further rotated −45 degrees. The light beam on the left-hand optical path acts as an extraordinary light beam on the birefringent element 12 for synthesis and hence is refracted thereat, whereas the light beam on the right-hand optical path acts as an ordinary light beam on the birefringent element 12 for synthesis and hence is permitted to travel straight intactly. The two light beams are synthesized for the output from the output port.

(Off-State/Light Interrupted State: See FIG. 5B)

The coil current is controlled so that the direction of Faraday rotation of the variable Faraday rotator 16 is set to +45 degree (see FIG. 3A). Of light beams entering through the input port in z direction, an ordinary light beam is permitted to travel straight by the birefringent element 10 for separation, but an extraordinary light beam is refracted to x direction for light separation by the birefringent element 10 for separation. The two light beams then enter the ½ wave plate 18 where their respective polarization directions are rotated +45 degrees. The two light beams pass intactly through the pair of polarizers 32 and enter the variable Faraday rotator 16 where their respective polarization directions are reversely rotated +45 degrees. The light beam on the left-hand optical path acts as an ordinary light beam on the birefringent element 12 for synthesis and hence is permitted to travel straight intactly, whereas the light beam on the right-hand optical path acts as an extraordinary light beam on the birefringent element 12 for synthesis and hence is refracted to the direction away from the ordinary light beam. For this reason, the two light beams are not synthesized and coupled together at the output port.

Figure 6:
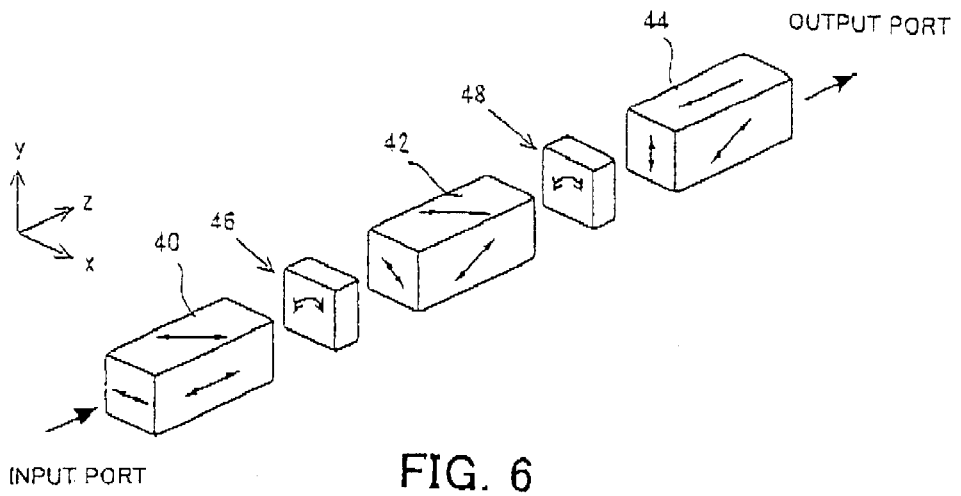
FIG. 6 illustrates a component array of a further embodiment of the beam shutter in accordance with the present invention.

FIG. 6 is a component array diagram showing a further embodiment of the beam shutter in accordance with the present invention. In a spaced apart relationship are arranged a plane-parallel birefringent element 40 for separation serving to separate input light beams having orthogonal polarization directions on the same optical path, and a plane-parallel birefringent element 42 for optical path control serving to control the optical paths depending on the polarization direction, and a plane-parallel birefringent element 44 serving to synthesize light beams having orthogonal polarization directions on different optical paths, for output. ±45 degree variable Faraday rotators 46 and 48 are interposed respectively between the birefringent element 40 for separation and the birefringent element 42 for optical path control and between the birefringent element 42 for optical path control and the birefringent element 44 for synthesis such that the transmission and interruption of the output light beams are controlled by switching the polarization direction by means of the variable Faraday rotators 46 and 48. Arrows in each optical component indicate the direction of the optical axis or the direction of the Faraday rotation. The orientations of the birefringent element for separation and birefringent element for synthesis may differ from each other by 90 degrees or may be the same, although the optical axis of the birefringent element for optical path control is tilted as shown relative to x, y and z axes. This configuration results substantially in a 1.5-stepped beam shutter.

Figure 7A:
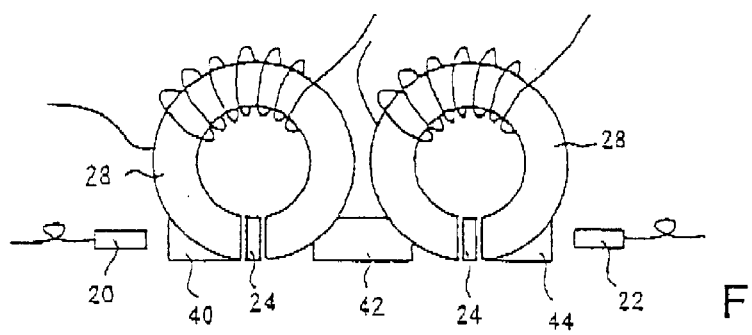
FIGS. 7A and 7b are explanatory diagrams of exemplary structures thereof.
Figure 7B:
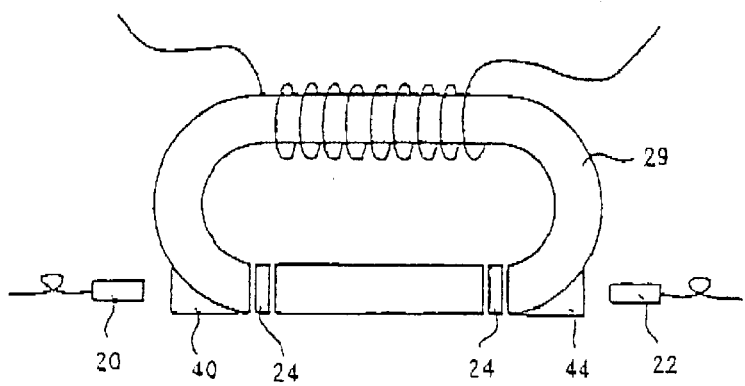

FIGS. 7A and 7B illustrate exemplary structures of this beam shutter. An input port 20 is positioned opposite to the birefringent element 40 for separation, with an output port 22 confronting the birefringent element 44 for synthesis. The ±45 degree variable Faraday rotator comprises a 45 degree Faraday element 24 disposed on the optical path, and a magnetic circuit having a coil and a gap for receiving the Faraday element 24. The material of the magnetic circuit is preferably a semi-hard magnetic material presenting square-loop hysteresis characteristics, similar to the above. The example as shown in FIG. 7A is a configuration in which a single magnetic circuit is associated with a corresponding Faraday element 24, whilst the example as shown in FIG. 7B is a configuration in which a common magnetic circuit 29 is shared by two different Faraday elements 24 at different locations.

Figure 8A:
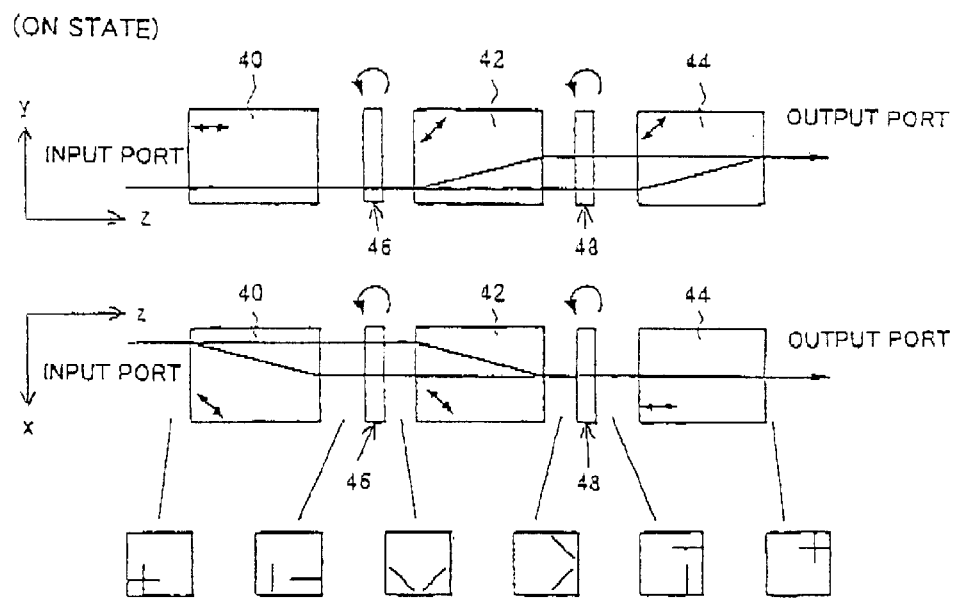
FIGS. 8A and 8B are explanatory diagrams of optical paths thereof.

(On-State/Light Transmitted State: See FIG. 8A)

The coil current is controlled so that the directions of Faraday rotation of the variable Faraday rotators 46 and 48 are both set to −45 degree. Of light beams entering through the input port in z direction, an ordinary light beam is permitted to travel straight by the birefringent element 40 for separation, but an extraordinary light beam is refracted to x direction for light separation by the birefringent element 40 for separation. The two light beams enter the first Faraday rotator 46 where their respective polarization directions are rotated −45 degrees. The light beam on the right-hand optical path acts as an ordinary light beam on the birefringent element 42 for optical path control and hence is permitted to travel straight intactly, whereas the light beam on the left-hand optical path acts as an extraordinary light beam on the birefringent element 42 for optical path control and hence is refracted thereat to change its optical path. The two light beams are then subjected to −45 degree rotation of the respective polarization directions by the second variable Faraday rotator 48. The light beam on the upper right optical path acts as an ordinary light beam on the birefringent element 44 for synthesis and hence is permitted to travel straight intactly, whereas the light beam on the lower right optical path acts as an extraordinary light beam on the birefringent element 44 for synthesis and hence is refracted thereat to the direction coming closer to each other. The two light beams are synthesized for the output from the output port.

Figure 8B:
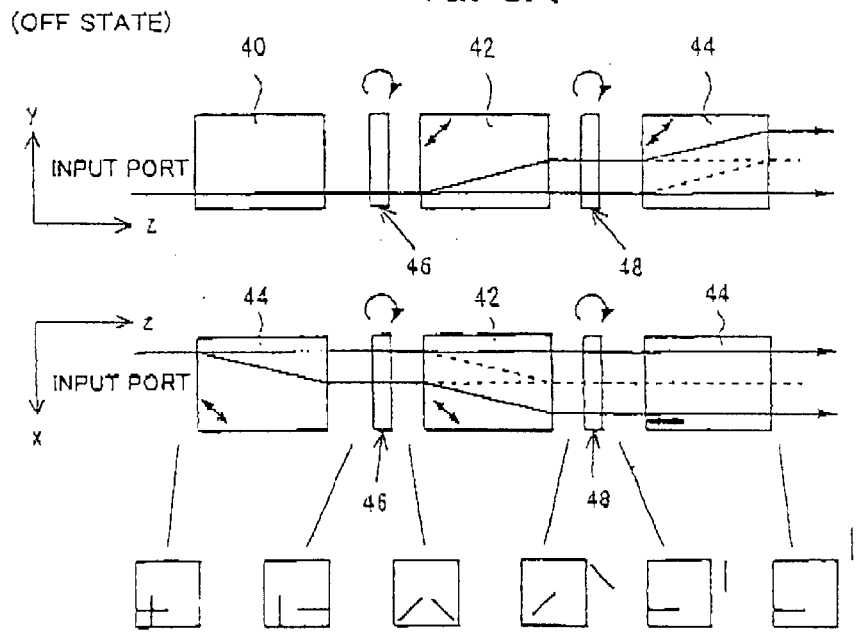

(Off-State/Light Interrupted State: See FIG. 8B)

The coil current is controlled so that the directions of Faraday rotation of the variable Faraday rotators 46 and 48 are both set to +45 degree. Of light beams entering through the input port in z direction, an ordinary light beam is permitted to travel straight by the birefringent element 10 for separation, but an extraordinary light beam is refracted to x direction for light separation by the birefringent element 40 for separation. The two light beams enter the first Faraday rotator 46 where their respective polarization directions are rotated +45 degrees. The light beam on one hand acts as an ordinary light beam on the birefringent element 42 for optical path control and hence is permitted to travel straight intactly, whereas the light beam on the other hand acts as an extraordinary light beam on the birefringent element 42 for optical path control and hence is refracted thereat to change its optical path. The two light beams are then subjected to +45 degree rotation of the respective polarization directions by the second variable Faraday rotator 48. The light beam on one hand acts as an ordinary light beam on the birefringent element 44 for synthesis and hence is permitted to travel straight intactly, whereas the light beam on the other hand acts as an extraordinary light beam on the birefringent element 44 for synthesis and hence is refracted thereat to the direction coming away from each other. For this reason, the two light beams are not synthesized and coupled together at the output port.

Figure 9:
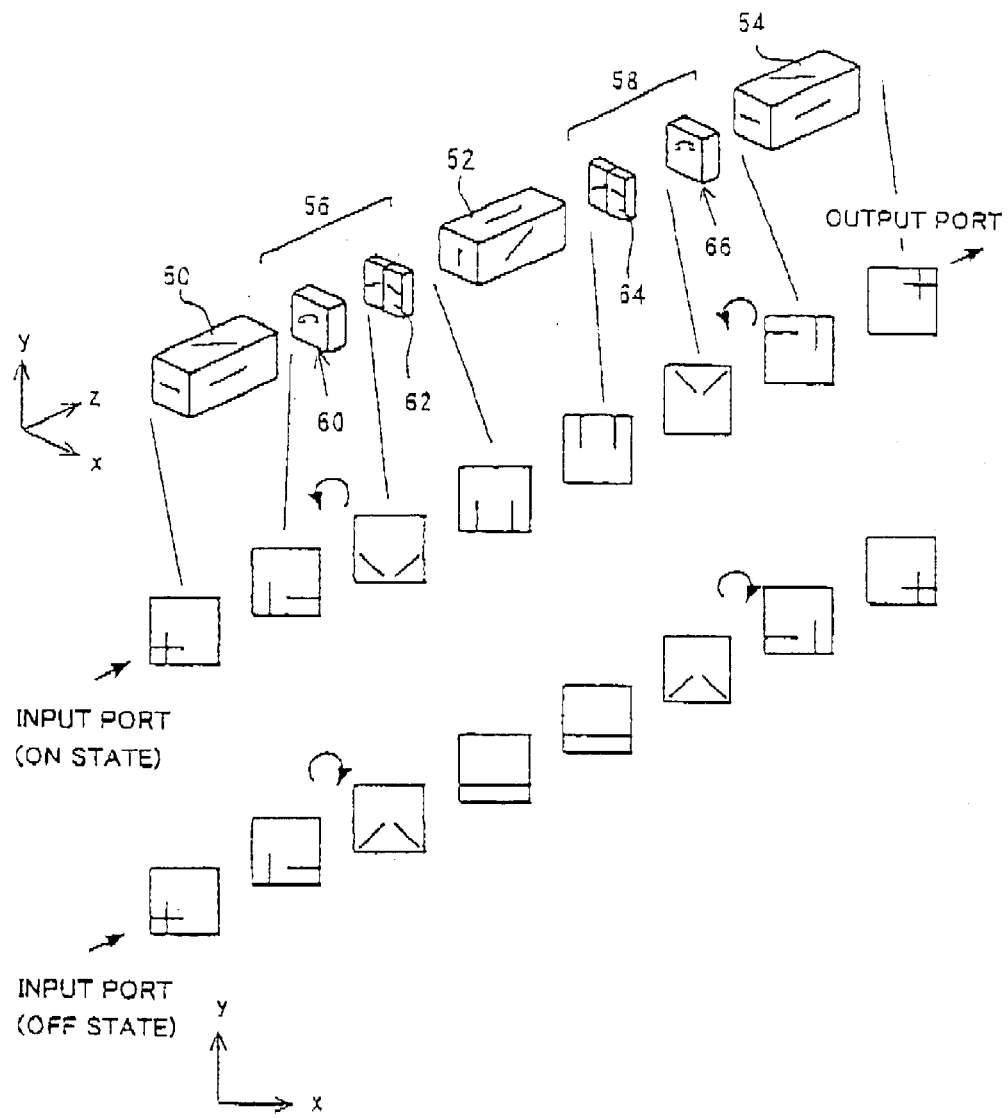
FIG. 9 illustrates a component array of a yet further embodiment of the beam shutter in accordance with the present invention.

FIG. 9 is a component array diagram showing a yet further embodiment of the beam shutter in accordance with the present invention. In a spaced apart relationship are arranged a plane-parallel birefringent element 50 for separation serving to separate input light beams having orthogonal polarization directions on the same optical path, and a plane-parallel birefringent element 52 for optical path control serving to control the optical paths depending on the polarization direction, and a plane-parallel birefringent element 54 serving to synthesize light beams having orthogonal polarization directions on different optical paths, for output. Polarization rotating means 56 and 58 are interposed respectively between the birefringent element 50 for separation and the birefringent element 52 for optical path control and between the birefringent element 52 for optical path control and the birefringent element 54. The polarization rotating means 56 and 58 comprise ±45 degree variable Faraday rotators 60 and 66, respectively, and a pair of ½ wave plates 62 and 64, respectively. The light beam transmission and interruption are controlled by switching the polarization directions by means of the variable Faraday rotators 60 and 66. The pair of ½ wave plates 62 and 64 each have optical axes tilted relative to x axis by −22.5 degrees and +22.5 degrees on the left and right optical paths, respectively.

Figure 10A:
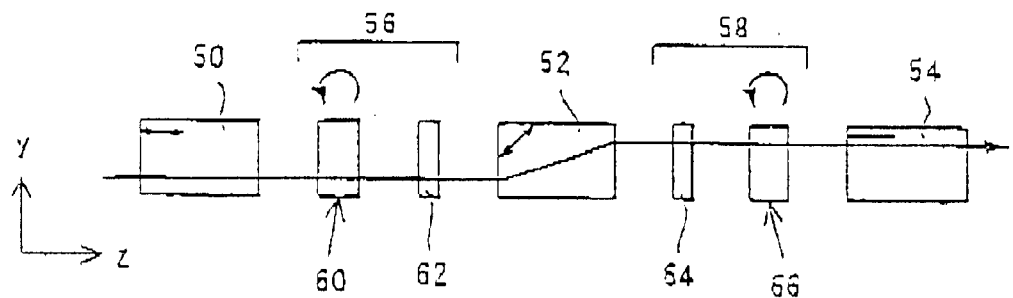
FIGS. 10A and 10B are explanatory diagrams of optical paths thereof.
Figure 10A:
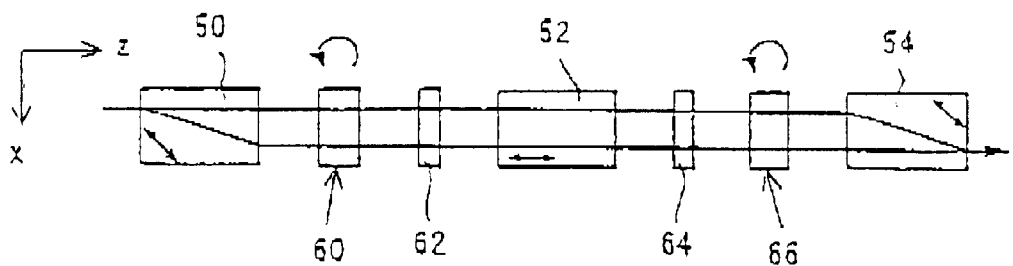

(On-State/Light Transmitted State: See FIG. 10A)

Figure 10B:
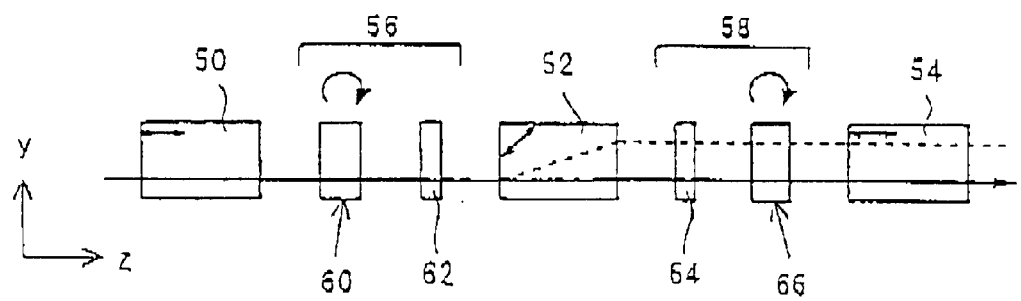
Figure 10B:
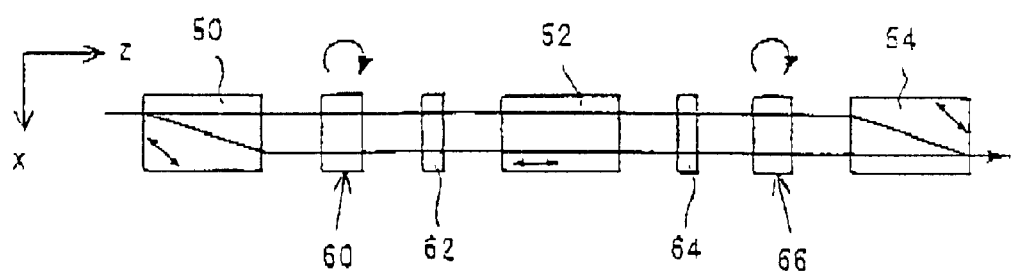

The coil current is controlled so that the directions of Faraday rotation of the variable Faraday rotators 60 and 66 are both set to −45 degree. Of light beams entering through the input port in z direction, an ordinary light beam is permitted to travel straight by the birefringent element 50 for separation, but an extraordinary light beam is refracted to x direction for light separation by the birefringent element 50 for separation. The two light beams are subjected by the first Faraday rotator 60 to −45 degree rotation of the polarization directions, and by the first ½ wave plate 62 to +45 degree rotation on the left side and −45 degree rotations on the right side, resulting in parallel light beams. The two light beaus act as extraordinary light beams on the birefringent element 52 for optical path control and hence are refracted thereat to change their optical paths. The two light beams are then subjected by the second ½ wave plate 64 to −45 degree rotation on the left side and +45 degree rotation on the right side, and by the second variable Faraday rotator 66 to −45 degree rotation of their polarization directions, resulting in having orthogonal polarization directions. The light beam on one hand acts as an ordinary light beam on the birefringent element 54 for synthesis and hence is permitted to go straight on intactly, whereas the light beam on the other hand acts as an extraordinary light beam on the birefringent element 54 for synthesis and hence is refracted thereat to the direction coming closer to each other. The two light beams are synthesized and output from the output port.
(Off-State/Light Interrupted State: See FIG. 10B)

The coil current is controlled so that the directions of Faraday rotation of the variable Faraday rotators 60 and 66 are both set to +45 degrees. Of light beams entering through the input port in z direction, an ordinary light beam is permitted to travel straight by the birefringent element 50 for separation, but an extraordinary light beam is refracted to x direction for light separation by the birefringent element 50 for separation. The two light beams are subjected by the first Faraday rotator 60 to +45 degree rotation of the polarization directions, and by the first ½ wave plate 62 to +45 degree rotation on the left side and −45 degree rotation on the right side, resulting in parallel light beams. The two light beams act as ordinary light beams on the birefringent element 52 for optical path control and hence are permitted to go straight on intactly without changing their optical paths. The two light beams are then subjected by the second ½ wave plate 64 to −45 degree rotation on the left side and +45 degree rotation on the right side, and by the second variable Faraday rotator 66 to +45 degree rotation of their polarization directions, resulting in having orthogonal polarization directions. The light beam on one hand acts as an ordinary light beam on the birefringent element for synthesis and hence is permitted to go straight on intactly, whereas the light beam on the other hand acts as an extraordinary light beam on the birefringent element for synthesis and hence is refracted thereat to the direction coming closer to each other. In consequence, the two light beams are synthesized and coupled together at a location different from the output port, i.e., the two light beams are not coupled together at the output port. If the output port is reversely located, then the on and off rotational directions of the variable Faraday rotator may be reversed.

Figure 11:
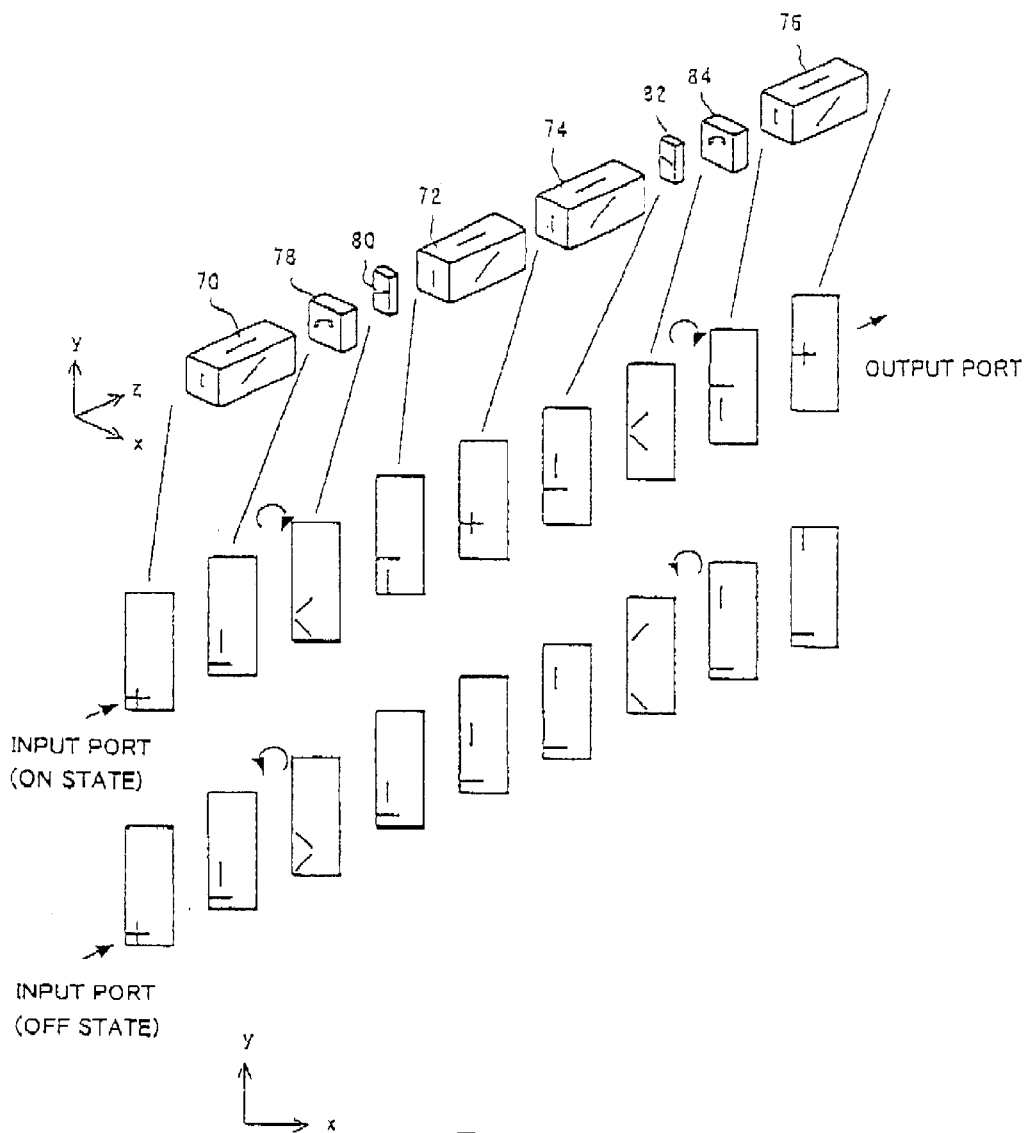
FIG. 11 illustrates a component array of a still further embodiment of the beam shutter in accordance with the present invention.
Figure 12A:
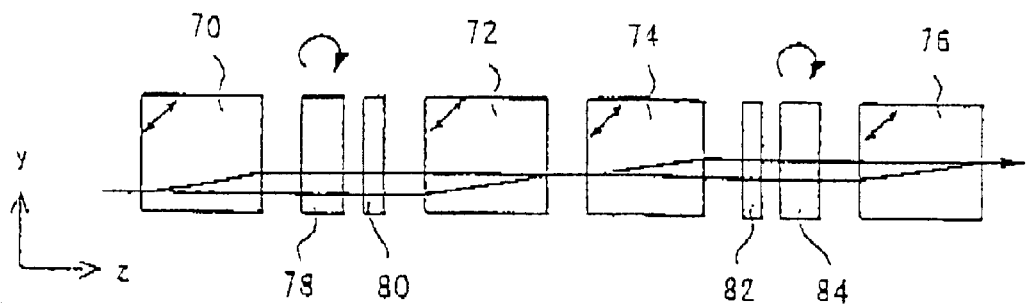
FIGS. 12A and 12B are explanatory diagrams of optical paths thereof.
Figure 12A:
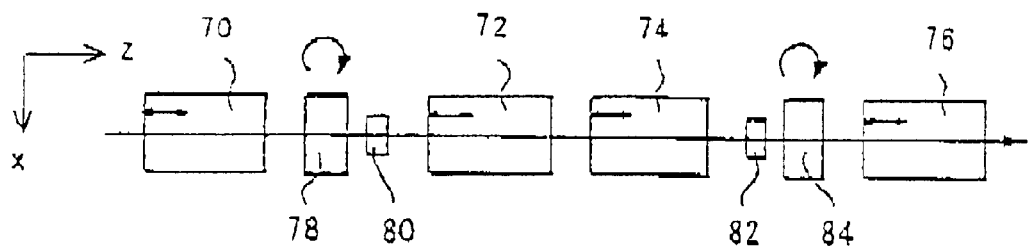

FIG. 11 is a component array diagram showing a still further embodiment of the beam shutter in accordance with the present invention. In a spaced apart relationship are arranged a first plane-parallel birefringent element 70 for separation serving to separate input light beams having orthogonal polarization directions on the same optical path, and a first plane-parallel birefringent element 72 for synthesis serving to synthesize light beams having orthogonal polarization directions on different optical paths, for output, posterior to which in a spaced apart relationship are arranged a second plane-parallel birefringent element 74 for separation serving to separate input light beams having orthogonal polarization directions on the same optical path, and a second plane-parallel birefringent element 76 for synthesis serving to synthesize light beams having orthogonal polarization directions on different optical paths, for output. A ±45 degree variable Faraday rotator 78 and a ½ wave plate 80 are interposed between the first birefringent element 70 for separation and the first birefringent element 72 for synthesis, whilst a ½ wave plate 82 and a ±45 degree variable Faraday rotator 84 are interposed between the second birefringent element 74 for separation and the second birefringent element 76 for synthesis. The light beam transmission and interruption are controlled by switching the polarization directions by means of the variable Faraday rotators 78 and 84. The ½ wave plates 80 and 82 each have an optical axis tilted −22.5 degrees relative to x axis.
(On-State/Light Transmitted State: See FIG. 12A)

Figure 12B:
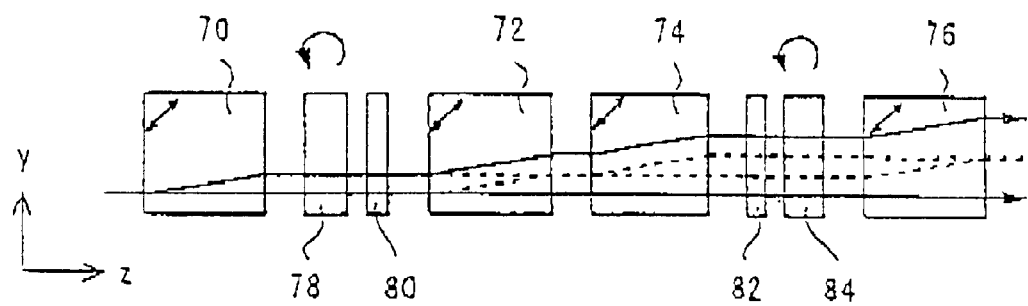
Figure 12B:
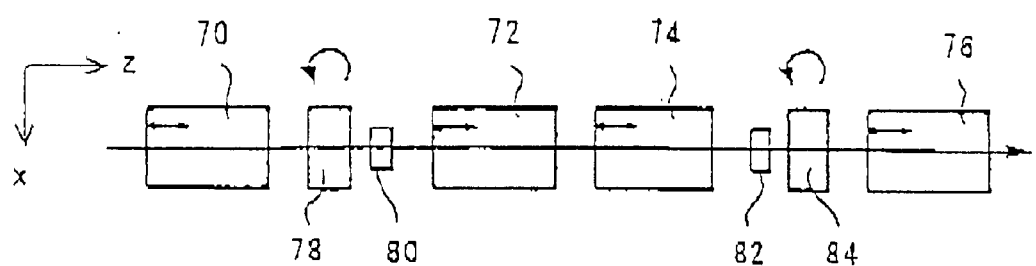

The coil current is controlled so that the directions of Faraday rotation of the variable Faraday rotators 78 and 84 are both set to +45 degree. Of light beams entering through the input port in z direction, an ordinary light beam is permitted to travel straight by the first birefringent element 70 for separation, but an extraordinary light beam is refracted to x direction for light separation by the first birefringent element 70 for separation. The two light beams are subjected by the first Faraday rotator 78 to +45 degree rotation of the polarization directions, and by the first ½ wave plate 80 to further +45 degree rotation. The two light beams are synthesized by the first birefringent element for synthesis. Then, the two light beams are again light separated by the second birefringent element 74 for separation, which in turn are subjected by the second ½ wave plate 82 to +45 degree rotation of the polarization directions and by the second variable Faraday rotator 84 to +45 degree rotation of the polarization directions. The light beam on one hand acts as an ordinary light beam on the second birefringent element 76 for synthesis and hence is permitted to go straight on intactly, whereas the light beam on the other hand acts as an extraordinary light beam on the second birefringent element 76 for synthesis and hence is refracted thereat to the direction coming closer to each other. The two light beams are synthesized and output from the output port.
(Off-State/Light Interrupted State: See FIG. 12B)

The coil current is controlled so that the directions of Faraday rotation of the variable Faraday rotators 78 and 84 are both set to −45 degrees. Of light beams entering through the input port in z direction, an ordinary light beam is permitted to travel straight by the first birefringent element 70 for separation, but an extraordinary light beam is refracted to y direction for light separation by the birefringent element 70 for separation. The two light beams are subjected by the first Faraday rotator 78 to −45 degree rotation of the polarization directions, and by the first ½ wave plate to +45 degree rotation. The light beam on one hand acts as an ordinary light beam on the first birefringent element 72 for synthesis and hence is permitted to go straight on intactly, whereas the light beam on the other hand acts as an extraordinary light beam on the first birefringent element 72 for synthesis and hence is refracted thereat to the direction apart from each other in y direction. The two light beams are then refracted by the second birefringent element 74 to the direction coming farther away from each other. The two lights are then subjected by the second ½ wave plate 82 to +45 degree rotation of the polarization directions and by the second variable Faraday rotator 84 to −45 degree rotation of the polarization directions. The light beam on one hand acts as an ordinary light beam on the second birefringent element 76 for synthesis and hence is permitted to go straight on intactly, whereas the light beam on the other hand acts as an extraordinary light beam on the second birefringent element 76 for synthesis and hence is refracted to the direction farther apart from each other. As a result, the two light beams come farther apart from each other and are not coupled together at the output port.

Several beam shutters configured to switch the two ±45 degree variable Faraday rotators by a single coil in the component array of FIG. 9 were experimentally produced and their characteristics were measured. The following satisfactory results were obtained.

Insertion loss (input port upon transmission→output port): 0.45 to 0.60 dB

Isolation (output port upon transmission→input port): 58.0 to 63.7 dB

Cross talk (input port upon interruption→output port): 58.2 to 63.1 dB

Response time: 0.55 to 0.65 milliseconds

The above embodiments use the semi-hard magnetic material presenting square-loop hysteresis characteristics as the material of the magnetic circuit for applying an external magnetic field to the Faraday elements and flow brief pulsed current therethrough to thereby switch and hold the direction of magnetization. Alternatively, the magnetic circuit may be formed from a soft magnetic material such that current keeps on flowing at all times in one direction and that when its reversion is desired, current keeps on flowing in the reverse direction.

The above embodiments according to the present invention provide the thus configured magneto-optical beam shutter free from any movable parts and therefore makes it possible to achieve a rapid switching between transmission and interruption, reduce the size, prevent the deterioration of characteristics, improve the reliability and securely protect the light receiving elements, etc.

By virtue of use of the plane-parallel birefringent elements, the beam shutter in accordance with the present invention is easy to work, inexpensive to manufacture, and simple to assemble since the positional offset normal to the optical axis does not affect the accuracy of the light beam transmission and interruption to a large extent.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A beam shutter comprising:
   a plane-parallel birefringent element for separation arranged to separate input light beams having orthogonal polarization directions on the same optical path;
   a plane-parallel birefringent element for synthesis arranged to synthesize light beams having orthogonal polarization directions on different optical paths, for output;
   said birefringent element for separation and said birefringent element for synthesis being disposed in a spaced apart relationship; and
   polarization rotating means having a variable Faraday rotator, said polarization rotating means interposed between said birefringent element for separation and said birefringent element for synthesis, for magneto-optically controlling the polarization directions; wherein
   transmission and interruption of output light beams are controlled by switching the polarization directions by means of said variable Faraday rotator.

2. The beam shutter according to claim 1, wherein said polarization rotating means include a combination of a ±45 degree variable Faraday rotator and a ½ wave plate having an optical axis defined to rotate the polarization directions through 45 degrees.

3. The beam shutter according to claim 1, wherein said polarization rotating means include, in the mentioned order, a ½ wave plate arranged to rotate the polarization directions through 45 degrees, a pair of polarizers having optical axes symmetrically defined on both optical paths so as to allow light beams transmitted through said ½ wave plate to intactly pass therethrough, and a ±45 degree variable Faraday rotator.

4. The beam shutter according to claim 1, wherein said variable Faraday rotator comprises a Faraday element and variable magnetic field applying means, said variable magnetic field applying means being comprised of magnetic circuits each having a coil and a gap, the direction of Faraday rotation being changed through the control of the direction of magnetic field applied.

5. The beam shutter according to claim 4, wherein said magnetic circuit is made of a semi-hard magnetic material so that the direction to Faraday rotation can be kept in spite of cutoff of current flowing through said coil.

6. A beam shutter comprising:
   a plane-parallel birefringent element for separation arranged to separate input light beams having orthogonal polarization directions on the same optical path;
   a plane-parallel birefringent element for optical path control arranged to control optical paths depending on the polarization directions;
   a plane-parallel birefringent element for synthesis arranged to synthesize light beams having orthogonal polarization directions on different optical paths, for output;
   said birefringent element for separation, said birefringent element for optical path control and said birefringent element for synthesis being disposed in a spaced apart relationship; and
   polarization rotating means interposed between said birefringent element for separation and said birefringent element for optical path control and between said birefringent element for optical path control and said birefringent element for synthesis, said polarization rotating means rotating the polarization directions through 45 degrees, at least one of said polarization rotating means having a ±45 degree variable Faraday rotator; wherein
   transmission and interruption of output light beams are controlled by switching the polarization directions by means of said variable Faraday rotator.

7. The beam shutter according to claim 6, wherein said variable Faraday rotator comprises a Faraday element and variable magnetic field applying means, said variable magnetic field applying means being comprised of a single magnetic circuit having a coil and at least one gap, the direction of Faraday rotation being changed through the control of the direction of magnetic field applied.

8. The beam shutter according to claim 7, wherein said magnetic circuit is made of a semi-hard magnetic material so that the direction of Faraday rotation can be kept in spite of cutoff of current flowing through said coil.

9. A beam shutter comprising:

a plane-parallel birefringent element for separation arranged to separate input light beams having orthogonal polarization directions on the same optical path;

a plane-parallel birefringent element for optical path control arranged to control optical paths depending on the polarization directions;

a plane-parallel birefringent element for synthesis arranged to synthesize light beams having orthogonal polarization directions on different optical paths, for output;

said birefringent element for separation, said birefringent element for optical path control and said birefringent element for synthesis being disposed in a spaced apart relationship;

first polarization rotating means interposed between said birefringent element for separation and said birefringent element for optical path control, for converting the polarization directions from orthogonal to parallel; and second polarization rotating means interposed between said birefringent element for optical path control and said birefringent element for synthesis, for converting the polarization directions from orthogonal to parallel;

at least one of said first and second polarization rotating means having a ±45 degree variable Faraday rotator; wherein transmission and interruption of output light beams are controlled by switching the polarization directions by means of said variable Faraday rotator.

10. The beam shutter according to claim 9, wherein said variable Faraday rotator comprises a Faraday element and variable magnetic field applying means, said variable magnetic field applying means being comprised of a single magnetic circuit having a coil and at least one gap, the direction of Faraday rotation being changed through the control of the direction of magnetic field applied.

11. The beam shutter according to claim 10, wherein said magnetic circuit is made of a semi-hard magnetic material so that the direction of Faraday rotation can be kept in spite of cutoff of current flowing through said coil.

12. A beam shutter comprising:

a first plane-parallel birefringent element for separation arranged to separate input light beams having orthogonal polarization directions on the same optical path;

a first plane-parallel birefringent element for synthesis arranged to synthesize light beams having orthogonal polarization directions on different optical paths, for output;

said first birefringent element for separation and said first birefringent element for synthesis being disposed in a spaced apart relationship;

a second plane-parallel birefringent element for separation arranged to separate input light beams having orthogonal polarization directions on the same optical path;

a second plane-parallel birefringent element for synthesis arranged to synthesize light beams having orthogonal polarization directions on different optical paths, for output;

said second birefringent element for separation and said second birefringent element for synthesis being disposed in a spaced apart relationship and located posterior to said first birefringent element for separation and said first birefringent element for synthesis;

first polarization rotating means having a variable Faraday rotator, said first polarization rotating means interposed between said first birefringent element for separation and said first birefringent element for synthesis, for controlling the polarization directions;

second polarization rotating means having a variable Faraday rotator, said second polarization rotating means interposed between said second birefringent element for separation and said second birefringent element for synthesis, for controlling the polarization directions; wherein transmission and interruption of output light beams are controlled by switching the polarization directions by means of said first and second variable Faraday rotators.

13. The beam shutter according to claim 12, wherein said variable Faraday rotator comprises a Faraday element and variable magnetic field applying means, said variable magnetic field applying means being comprised of a single magnetic circuit having a coil and at least one gap, the direction of Faraday rotation being changed through the control of the direction of magnetic field applied.

14. The beam shutter according to claim 13, wherein said magnetic circuit is made of a semi-hard magnetic material so that the direction of Faraday rotation can be kept in spite of cutoff of current flowing through said coil.

* * * * *